US 6,572,696 B1

(12) United States Patent
Berenguer et al.

(10) Patent No.: US 6,572,696 B1
(45) Date of Patent: Jun. 3, 2003

(54) TECHNOLOGICAL ADDITIVE FOR AGGLOMERATING PROJECTABLE BUILDING MATERIALS AND UTILIZATION OF THE ADDITIVE IN PROJECTED MORTARS AND CONCRETES

(75) Inventors: Antonio Alvarez Berenguer, Boadilla del Monte (ES); Francisco Javier Limpo Orozco, Bruenete (ES); Bernardo Enrique Del Valle Álvarez, Madrid (ES); Manuel Hidalgo Martín, Madrid (ES)

(73) Assignee: Tolsa, S.A., Madrid (ES)

( * ) Notice: Subject to any disclaimer, the term of this patent is extended or adjusted under 35 U.S.C. 154(b) by 0 days.

(21) Appl. No.: 09/700,076

(22) PCT Filed: May 12, 1999

(86) PCT No.: PCT/ES99/00133

§ 371 (c)(1),
(2), (4) Date: Nov. 10, 2000

(87) PCT Pub. No.: WO99/58465

PCT Pub. Date: Nov. 18, 1999

(30) Foreign Application Priority Data

May 12, 1998 (ES) .............................................. 9800990

(51) Int. Cl.$^7$ .......................... C04B 12/00; C04B 16/00; C04B 28/04; C04B 7/02
(52) U.S. Cl. ...................... 106/684; 106/694; 106/718; 106/719; 106/803; 106/811
(58) Field of Search ................................ 106/684, 694, 106/718, 719, 803, 811

(56) References Cited

U.S. PATENT DOCUMENTS

| 4,861,378 A | * | 8/1989 | Watanabe et al. ............ 106/719 |
| 5,034,160 A | * | 7/1991 | Kindt et al. ............... 106/18.12 |
| 5,294,255 A | * | 3/1994 | Smetana et al. ............. 106/675 |
| 5,650,004 A | * | 7/1997 | Yon ........................... 106/719 |

FOREIGN PATENT DOCUMENTS

| EP | 0170299 A2 | * | 2/1986 |
| EP | 0454222 A1 | * | 10/1991 |

* cited by examiner

Primary Examiner—Elizabeth D. Wood
(74) Attorney, Agent, or Firm—Klauber & Jackson

(57) ABSTRACT

New additive for projectable agglomerating materials in the building industry, said additive comprising at least one clay of rheologic grade, preferably sepiolite, a water reducer/fluidifier and an aeration agent, as well as the utilization of said additive as component of projectable agglomerating materials such as mortars and concretes.

19 Claims, No Drawings

TECHNOLOGICAL ADDITIVE FOR AGGLOMERATING PROJECTABLE BUILDING MATERIALS AND UTILIZATION OF THE ADDITIVE IN PROJECTED MORTARS AND CONCRETES

TECHNICAL FIELD OF THE INVENTION

The present invention belongs to the field of additives designed for conglomerate building materials, and more specifically to the sector of projectable conglomerates such as projected mortar and concrete.

PRIOR ART OF THE INVENTION

The increase that the use of conglomerates has experimented in the building sector, as well as the onset of new preparation techniques thereof and of placement techniques (projected, injected, prefabricated conglomerates . . . ), is closely related to the use of products added thereto in small amounts. These products are known as additives and without their use it would be impossible to obtain more competitive products in technical and economic aspects than conventional products.

Among the different types of applications in which conglomerates require the use of additives for the purpose of achieving a satisfactory performance, are projectable conglomerates such as projected mortar and concrete. These are used for a diversity of applications among which stand out, supporting tunnels, stabilizing slopes, public works and covering facades.

Although projectable conglomerate materials are on many occasions of a very different nature, they have a series of fundamental properties and characteristics in common, for the purpose of achieving satisfactory yields in respect of the overall performance qualities for which they are manufactured. Among these characteristics, and fundamental properties, it should be emphasized that they must be capable of being dry or wet pumped by mechanical means in dense or diluted flow, in addition to having good adherence to the surfaces on which they are projected, good docility, suitable water retention, sufficient open time, absence of segregation of the components and of water exudation, good strength against compression, suitable surface texture, absence of cracks and good frost resistance.

Thus, projectable conglomerate materials must have a good adherence that is manifested in that when being projected on a surface, they must endure the least possible rebounding.

The docility of projected conglomerate materials leads to good workability in the facing on which they have been projected, consisting in a reduction of the effort and therefore of the time, that the worker must use to achieve a satisfactory final finish.

Suitable rheological behavior directly affects pumpability and workability of the projectable conglomerate material. This is due to the fact that the material, when being subjected to shear stress, should reduce its viscosity in order to reduce the necessary pumping energy per unit of mass, as well as the possible problems of clogging hoses and tubing of the projection equipment; however, when the shear stress inherent in stirring ceases, the materials should recover their colloidal structure increasing their viscosity and plasticity, for the purpose of obtaining effective covering of the surface on which they have been projected and for the purpose of reducing to the minimum the losses of material caused by the rebounding of the materials from the surface on which they have been projected.

Performance is a fundamental parameter for the efficiency and economy of projectable conglomerate building materials and refers basically to the covered surface per unit of projected mass for a same thickness of an applied layer.

Water retaining capacity is a determining property for correct setting of projectable conglomerate materials and has a direct relationship to their final resistance.

The open time of projectable conglomerate materials should be long enough so as to allow, before the setting thereof, their final finish to be carried out by the worker.

It is important that projectable conglomerate materials do not show segregation or exudation so that they have a correct homogeneity, for which purpose it is necessary to avoid separation of the components of the materials, in the tanks and pumping systems as well as once they have been applied to the surfaces.

Projectable conglomerate materials should also have a sufficient strength against compression so as to support the stresses they are subjected to once they have been projected. This is especially important when protecting surfaces and correcting stability problems in tunnels and other underground constructions.

The final texture and absence of cracks directly affect the durability of conglomerate materials, as well as the protection and consolidation of the surfaces on which they are projected. The absence of cracks is a critical factor for acceptance by workers who carry out the projection of the materials, as well as by the final users of the materials.

Frost resistance is important in applications of projectable conglomerate materials on facings and surfaces exposed to adverse weather conditions. This implies a direct impact on the durability and impermeability of consolidated surfaces and, consequently, on the profitability and efficiency of projection processes.

The above mentioned parameters and qualities should be taken into account when designing projectable conglomerate building materials.

Therefore, in the design of projectable conglomerate materials, such as projected mortar and projected concrete, in addition to establishing the proportions among the conventional components such as cement, aggregates and water in terms of the specific applications of the materials, the use of additives the purpose of which is to improve or modify the properties of the materials in the fresh and/or hardened state, is essential. Basically, the proportion of such additives should not be higher than 5% of the weight of the conglomerate component and they are normally added during the dry premixing, or otherwise during kneading with water, the "UNE-Una Norma Española=A Spanish Regulation"83200 Regulations (additives for concrete, mortar and paste) and subsequent ones depending on the additive in question, having to be complied with.

There is a diversity of additives for projectable conglomerate materials, among which the following groups should be emphasized:

Water reducing agents/fluidizers:(=the plasticizers). These additives, also called plasticizers, are used to increase the docility of projected building materials at a constant water/cement ratio, or to reduce this ratio to a constant docility. In general, plasticizers improve thixotropy, strength against compression, adherence and docility. However, they are very sensitive to overdose in which case they produce an excess inclusion of air, delays in setting or collapses of cohesiveness.

Promoters: These additives shorten the setting and/or hardening times and their use is very widespread in projectable conglomerate materials in view of the fact that, due to the peculiarities of the projecting process, placement in very short periods of time is required. Excess use of these additives produces mechanical regression and therefore dosage thereof must be strictly controlled.

Aerating agents: These additives have as their main function to improve icing-deicing cycle resistance.

Retarders: These additives delay the setting time of projectable conglomerate materials, which results in an extension of the open time and the possibility of working at temperatures higher than 25° C. They coadjuvate water retention and provide thixotropy to fresh material, carrying out "self-curing" which is very beneficial for the final quality of projected conglomerate materials.

Anti-rebound agents: These additives, such as for example conventional attapulgite and sepiolite, improve the fresh adherence and reduce the rebounding of projectable conglomerate materials.

Water retaining agents: These additives are products which due to their molecular structure and to their surface properties bind to the water by means of "weak bonds" and retain it in the matrix of the conglomerates during the setting and hardening process, thereby avoiding rapid drying and improving adherence.

Combinations of all the above mentioned additives are used in the formulation of projectable conglomerate materials, there not being a standard formulation, but rather combinations are made of all of them for the purpose of achieving the amplest possible presentations for projection processes. Despite all of this, the inconveniences that they have are important and they may be summarized as follows: complexity of the formulations, limitation in the possibility of projecting certain conglomerate materials and high cost of the formulations in order to achieve satisfactory performance qualities.

The complexity of conventional formulations is caused by the need to combine the different additives in suitable proportions in order to achieve that the conglomerate materials are projectable and have satisfactory performance and qualities, and also implies a high cost of the conventional formulations.

Conventionally, conglomerate materials with aggregates of a coarser granulometry, with a smaller proportion of cement and therefore of a lower cost, can only be projected by means of adding additives in high amounts that excessively increase the final cost of the product.

European patent application EP-A-0675089 describes an additive for conglomerate building materials that contains a silicate of swellable layers, such as for example bentonite, montmorillonite, hectorite, saponite, beidelite, saucelite, etc., but which are however not suitable as projectable mortar or concrete.

U.S. Pat. No. 5,294,255 describes a grout that contains Portland cement, a perlite, fly ash, a fine aggregate, an aerating agent, a thixotropic suspension agent and a bentonite thickening agent. This grout has little strength, apart from containing bentonite which tends to flocculate in the presence of the salts that are commonly found in aggregate fractions of projected concrete and mortar.

U.S. Pat. No. 5,034,160 describes a projectable composition that comprises a hydratable cement-like agglomerate, a porous aggregate, a fibrous material, an aerating agent and a rheopectic agent selected among attapulgite and sepiolite with average particle sizes larger than 44 micra or mixtures of these clays. This composition is useful to form fire-resistant coverings and acoustic insulation in steel infrastructures, but it does not have enough resistance or ductibility so as to constitute projectable mortar or concrete.

OBJECTS OF THE INVENTION

The objet of the present invention is to overcome the inconveniences of conventional conglomerate building materials, by means of a new additive that reduces the complexity of the formulations, that allows the projection of materials that up until now were not projectable and that reduces the cost. Besides, it improves the pumpability, docility, final finish and rebounding of conventional projectable materials. The present invention also has the object of providing projectable conglomerate building materials that contain the additive as well as the use of the new additive in projectable mortar and concrete.

DESCRIPTION OF THE INVENTION

The above defined objects are achieved by means of a new additive for projectable conglomerate materials that comprises at least: a solid mineral component selected from among Theological grade sepiolite and attapulgite with a particle size smaller than 40 micrometers, preferably smaller than 25 micrometers, or mixtures thereof, and a complementary agent selected among an aerating agent, a plasticize, an anti-rebound agent, preferably in the following proportions:

76 to 99.8%, preferably 83.5 to 98% by weight, of a solid mineral component;

0.2–24%, preferably 1–16.5% by weight of the complementary agent.

In one embodiment of the invention, the additive comprises:

0.1 to 14%, preferably 1 to 10% by weight, of at least an aerating agent; and 0.1 to 10%, preferably 1 to 6.5% by weight, of at least a water reducing agent/flux.

In another embodiment of the invention, the additive comprises 0.2–24% by weight, preferably 1–16.5% by weight, of an anti-rebound agent selected from among conventional sepiolite and attapulgite granulates and mixtures thereof.

With the combined use of these components it is possible to achieve the above defined objects.

The solid mineral component is preferably rheological grade sepiolite as that described for example in European patent applications EP-A-0454222 and EP-A-0170299, the content of which is included in the present description by reference.

Rheological grade sepiolite, marketed for example by TOLSA, S.A., Madrid, Spain under the trade mark PANGEL, and obtained from natural sepiolite by means of special micronization processes that substantially prevent breakage of the sepiolite fibers, easily disperses in water and other polar liquids and has an external surface with a high degree of irregularity, a high specific surface, greater than 300 m$^2$/g, and a high density of active centers for adsorption, which confer a high water retaining capacity upon being capable of forming, with relative ease, hydrogen bridges with said active centers. The microfibrous nature of the particles of Theological grade sepiolite makes this a material with high porosity and low apparent density. Due to the above mentioned properties, it is capable of forming high viscosity pastes with excellent thixotropic and pseudoplastic behavior. In accordance with the invention, it has been possible to verify that, when rheological grade sepiolite is added to projectable conglomerate building materials such as mortar and concrete, it improves pumpability, adhesiveness, cohesion, surface performance and texture thereof.

Additionally, sepiolite has a very low cationic exchange capacity and its interaction with electrolytes is very weak, which in turn causes rheological grade sepiolite to be practically not affected by the presence of salts in the medium in which it is located, and it remains stable over a broad pH range. This advantage is very important in media with a high salt content.

The above mentioned advantages and qualities pointed out with regard to rheological grade sepiolite, can also be attributed to rheological grade attapulgites with particle sizes smaller than 40 micra, such as for example the range of ATTAGEL goods (for example ATTAGEL 40 and ATTA-GEL 50) manufactured and marketed by the firm Engelhard Corporation, United States, and the MIN-U-GEL range of Floridin Company.

The aerating agent may be per se known agent and may be selected from among Vinsol neutralized resins, acid organic salts, higher fatty acids, hydrocarbon derivatives and mixtures thereof. In a preferred embodiment of the invention, the aerating agent is Vinsol resin.

The water reducing agent/fluidizer (=the plasticizer) may be selected from among agents known themselves, such as for example, from among lignosulfate calcium and sodium salts, carboxylic acid, hydroxylated polymers, sulfonated formaldehyde-naphthalene polymers, formaldehyde-melamine polymers and mixtures thereof. In a preferred embodiment of the invention, the plasticizer is a sulfonated formaldehyde naphthalene polymer.

The anti-rebound agent may be for example a conventional attapulgite or sepiolite.

Preparation of the additive according to the invention is carried out by a simple mixing of the different components without any preferable order of addition being necessary. In one embodiment a V mixer was used, with a mixing time of 5 minutes, resulting in a homogenous product.

Another object of the present invention is the use of the new additive in projectable mortar and concrete. In one embodiment, the projectable conglomerate comprises a cement fraction and an aggregate fraction, that also contains 0.1–0.6%, for example 0.2–0.4%, by weight of additive according to the invention. The cement fraction is present in a proportion of 10 to 50% referred to the total weight of the composition and the aggregate fraction has a particle size smaller than 40 mm.

The additive may be mixed together with the aggregate and cement fractions during the manufacturing of the projectable conglomerate material, or during the mixing of said fraction with the kneading water.

Incorporation of the additive of the present invention into projectable conglomerate materials, such as projected mortar and projected concrete, leads to very advantageous characteristics when compared to conventional additives and combinations of additives:

Improvement of pumpability.

Reduction of losses of the projected material by rebounding on the facing and better adherence of the final product;

Improvement of the workability based on the greater thixotropic character that the additive provides to the projected mixture, which permits a reduction of the labor costs in order to achieve a satisfactory final finish.

Increase of the covering capacity per unit of projected mass upon improving the thixotropy and plasticity thereof.

Suitable water retention, that permits projectable conglomerate materials to have good final properties.

Absence of segregation and exudation, based on the viscosity regulating and thixotropic qualities of the additive, that contribute to the homogeneity of the composition of the conglomerate materials;

Excellent resistance against compression and frost.

Possibility of obtaining excellent final finishes with very smooth surface textures, due to that the additive provides a soft and plastic consistency.

The possibility of doing without a large number of conventional additives and reducing the complexity inherent in the formulation of balanced mixtures of the same that were necessary to achieve the above mentioned qualities in conventional conglomerate materials, and therefore the reduction of the cost of the projectable conglomerate material;

Conversion into projectable conglomerate materials, even of conglomerate materials with a low cement/aggregate ratio, as well as materials with coarse granulometries.

At high temperatures and low relative humidity, other components, such as modified natural gums, modified starches, polyacrylamides and cellulose-like derivatives that may contribute to cracks not appearing, although they increase the final cost of the additive and therefore, the cost of the projectable conglomerate material, may be added to the additive according to the invention.

EMBODIMENTS OF THE INVENTION

The invention will be additionally illustrated hereinafter on the basis of the following embodiments:

EXAMPLE 1

A 40 kg. sample of additive according to the invention was prepared, mixing in a V mixer for 5 minutes, the following components:

35.2 kg. of rheological grade sepiolite (PANGEL—S9, of TOLSA, S.A. Madrid)

2.8 kg. of Vinsol resin 2.0 kg. of sulfonated formaldehyde naphthalene polymer until a homogenous product is obtained.

EXAMPLE 2

Different samples of a projected mortar, without an additive, with conventional additives and with the additive according to the present invention prepared according to claim 1, were prepared. Portland cement, aggregates with a particle size smaller than 2 mm and additives corresponding were in each case mixed for 5 minutes in a mixer until a homogeneous mixture of the components was obtained. Then each of the samples was kneaded with water until the following samples of projected mortar were obtained:

| Sample | Cement (kg) | Aggregates (kg) | Water/cement ratio | Additive according to the invention (kg) | Conventional additive (kg) |
|--------|-------------|-----------------|--------------------|------------------------------------------|----------------------------|
| I      | 450         | 1,700           | 0.4                | 6*                                       | —                          |
| II     | 450         | 1,700           | 0.4                | —                                        | —                          |
| III    | 450         | 1,700           | 0.4                | —                                        | 2.2**                      |

*PANGEL S-9
**Cellulose-like derivative:
0.8 kg. TYLOSE 10004 MH (HOECHST AG, Germany);
1 kg. plasticizer/aerating agent: PREMORTER MIX (PRERESA, Spain);
0.4 kg. anti-rebound agent: PANSIL 400 sepiolite (TOLSA, S.A., Spain)

Each of the prepared mortars were pumped and projected on a brick surface of approximately 100 m² using a PUTZMEISTER P11 VARIO machine with a conveying yield of 10–40 1/min, conveying distance of 60 m and a pumping pressure of 20 kg/cm². Then, an expert plasterer worked the covered surfaces and the final characteristics thereof were observed, taking into account that the majority of these characteristics are evaluated by means of subjective evaluations derived from the direct observation of the expert plasteres who worked the covered surfaces.

| Sample | I | II | III |
| --- | --- | --- | --- |
| Pumpability | Yes | Yes | Yes |
| Fresh adherence | Good | Poor | Good |
| Bouncing | Low | High | Low |
| Docility | Very good | Poor | Fair |
| Cracking | No | Yes | No |
| Texture | Smooth | Rough | Rough |

Approximate cost of the additive according to the invention per T of mortar according to the example: 650 Ptas.
Approximate cost of the conventional additive per T of mortar according to the example: 1,000 Ptas.

The results obtained reveal the advantages that the additive according to the invention has in current projectable conglomerates. Improvements of docility and texture, simplicity in the formulation and a lower cost than that of conventional additives, without even considering the cost derived from application itself, which is lower than that of conventional projectable conglomerates because the final product has a greater docility.

EXAMPLE 3

Different samples of a projected mortar, without an additive, with conventional additives and with the additive according to the present invention prepared according to claim 1, were prepared. Portland cement, aggregates with a particle size smaller than 4 mm and additives were in each case mixed for 5 minutes in the machine specified in example 1 until a homogeneous mixture of the components was obtained. Then each of the samples was kneaded with water until the following samples of projected mortar were obtained:

| Sample | Cement (kg) | Aggregates (kg) | Water/cement ratio | Additive according to the invention (kg) | Conventional additive (kg) |
| --- | --- | --- | --- | --- | --- |
| I | 350 | 1,500 | 0.5 | 6.8* | — |
| II | 350 | 1,500 | 0.5 | — | — |
| III | 350 | 1,500 | 0.5 | — | 2.5** |

*PANGEL S-9
**Cellulose-based derivative:
0.9 kg TYLOSE 10004 MH (HOECHST AG, Germany);
1.1 kg plasticizer/aerating agent: PREMORTER MIX (PRERESA, Spain);
0.5 kg anti-rebound agent: PANSIL 400 sepiolite (TOLSA, S.A., Spain)

Approximate cost of the additive according to the invention per T of mortar according to the example: 740 Ptas.
Approximate cost of the conventional additive per T of mortar according to the example: 1,170 Ptas.

The prepared mortars were subjected to pumping, with the above mentioned PUTZMEISTER machine. The following table shows that samples V and VI were not pumpable and, therefore, not projectable. The results that were observed as to the final characteristics of sample IV, were obtained and evaluated with conditions analogous to those described in example 2.

| Sample | IV | V | VI |
| --- | --- | --- | --- |
| Pumpability | Yes | No | No |
| Fresh adherence | Good | — | — |
| Bouncing | Low | — | — |
| Docility | Very good | — | — |
| Cracking | No | — | — |
| Texture | Smooth | — | — |

The results obtained according to this example, reveal the advantages of the additive according to the invention since it results in projected mortar with a lower cement content and a larger size of aggregates, perfectly pumpable and having a good fresh adherence, low rebounding, good docility, absence of cracking and excellent finish. The projection of conglomerate materials with a low cement content and therefore higher aggregate content, logically reduces the cost with regard to current projectable conglomerate materials.

What is claimed is:

1. A technological additive for projectable conglomerate building materials thats comprises a solid mineral component, and at least a complementary agent selected from the group consisting of aerating agents, plasticizers, anti-rebound agents and mixtures thereof, wherein the mineral component has a particle size smaller than 40 micrometers and is selected from the group consisting of theological grade sepiolite, rheological grade attapulgite and mixtures thereof.

2. An additive according to claim 1, comprising
76–99.8% by weight of the solid mineral component;
0.2–24% by weight of the complementary agent.

3. An additive according to claim 1, comprising
0.1–14% by weight of the aerating agent;
0.1–10% by weight of the plasticizer.

4. An additive according to claim 2, comprising
83.509% by weight of the solid mineral component;
2–16.5% by weight of the complementary agent.

5. An additive according to claim 1, comprising
1–10% by weight of the aerating agent; and
1–6.5% by weight of the plasticizer.

6. An additive according to claim 1, wherein the complementary agent is at least an anti-rebound agent.

7. An additive according to claim 1, wherein the solid mineral component is theological grade sepiolite with a particle size smaller than 25 micrometers.

8. An additive according to claim 1, wherein the solid mineral component is theological grade attapulgite with a particle size smaller than 25 micrometers.

9. An additive according to claim 1, wherein the aerating agent is selected from the group consisting of neutralized thermoplastic resins, acid organic salts, higher fatty acids, hydrocarbon derivatives and mixtures thereof.

10. An additive according to claim 1, wherein the aerating agent is a thermoplastic resin.

11. An additive according to any of claim 1, wherein the plasticizer is selected from the group consisting of lignosulfate sodium and calcium salts, carboxylic acids, hydroxylated polymers, sulfonated formaldehyde naphthalene polymers, formaldehyde-melamine polymers and mixtures thereof.

12. An additive according to claim 1, wherein the plasticizer is sulfonated formaldehyde naphthalene formaldehyde.

13. A projectable conglomerate building material that comprises a cement fraction and an aggregate fraction, the material comprising 0.1–0.6% by weight referred to the total weight of the composition, of the additive defined in claim 1.

14. A material according to claim 13, the material comprising 0.2–0.4% by weight of the additive.

15. A material according to claim 13, wherein the cement fraction is present in a proportion of 10 to 50%.

16. A material according to claim 13, wherein the cement fraction comprises Portland cement.

17. A material according to claim 13, wherein the aggregate fraction has a particle size smaller than 40 mm.

18. A material according to claim 13, being a projected mortar.

19. A material according to claim 13, being a projected concrete.

* * * * *